United States Patent [19]

Johnson

[11] Patent Number: 5,053,883
[45] Date of Patent: Oct. 1, 1991

[54] TERMINAL POLLING METHOD

[75] Inventor: Lee R. Johnson, Lawrenceville, Ga.

[73] Assignee: Scientific-Atlanta, Inc., Atlanta, Ga.

[21] Appl. No.: 340,659

[22] Filed: Apr. 20, 1989

Related U.S. Application Data

[63] Continuation-in-part of Ser. No. 289,218, Dec. 23, 1988, Pat. No. 4,987,486.

[51] Int. Cl.$^5$ .................... H04N 7/167; G05B 23/02
[52] U.S. Cl. ........................................ 358/349; 380/3; 358/84; 455/2; 340/825.08; 340/825.52
[58] Field of Search ....................... 364/241.1 MS File; 380/3, 4, 10; 358/349, 84, 86; 455/2; 340/825.08, 825.52; 370/85.8, 95.2

[56] References Cited

U.S. PATENT DOCUMENTS

| | | | |
|---|---|---|---|
| 3,484,748 | 12/1969 | Greenblum et al. | 340/153 |
| 3,777,278 | 12/1973 | Majeau et al. | 331/78 |
| 3,819,862 | 6/1974 | Hedges | 179/2 |
| 3,944,742 | 3/1976 | Cunningham | 178/66 |
| 4,000,378 | 12/1976 | Caplan | 370/85.8 |
| 4,031,543 | 6/1977 | Holz | 358/86 |
| 4,063,220 | 12/1977 | Metcalfe et al. | 340/147 |
| 4,156,847 | 5/1979 | Tazawa et al. | 325/308 |
| 4,241,410 | 12/1980 | DePuy | 364/715 |
| 4,365,145 | 12/1982 | Frentress | 235/92 |
| 4,365,267 | 12/1982 | Tsuda | 358/84 |
| 4,385,314 | 5/1983 | Yashiro et al. | 358/84 |
| 4,409,592 | 10/1983 | Hunt | 340/825.5 |
| 4,429,299 | 1/1984 | Kabat et al. | 340/310 |
| 4,455,570 | 6/1984 | Saeki et al. | 358/86 |
| 4,538,174 | 8/1985 | Gargini et al. | 358/86 |
| 4,575,750 | 3/1986 | Callahan | 358/86 |
| 4,611,306 | 9/1986 | Crehan et al. | 364/900 |
| 4,616,214 | 10/1986 | Naito | 340/533 |
| 4,633,462 | 12/1986 | Stifle et al. | 370/85 |
| 4,667,191 | 5/1987 | Comroe et al. | 340/825.5 |
| 4,679,192 | 7/1987 | Vanbrabant | 370/85 |
| 4,737,783 | 4/1988 | Tanaka et al. | 340/825.5 |
| 4,792,849 | 12/1988 | McCalley et al. | 358/86 |
| 4,916,737 | 4/1990 | Chomet et al. | 380/20 |
| 4,920,533 | 4/1990 | Dufresne et al. | 370/94.1 X |
| 4,924,462 | 5/1990 | Sojka | 370/95.2 |

FOREIGN PATENT DOCUMENTS 1536534 12/1978 United Kingdom.

OTHER PUBLICATIONS

NCR Skylink, NCR Corporation, Dayton, Ohio 45479, pp. 1-12.

Primary Examiner—Linda J. Wallace
Attorney, Agent, or Firm—Banner, Birch, McKie & Beckett

[57] ABSTRACT

A method of transferring data from a plurality of remote terminals to a central location over a communication network is disclosed. First random numbers are respectively generated for each of the remote terminals. A mask value is then determined. The random numbers associated with the remote terminals are compared with the mask value to determine whether a respective terminal attempts to transfer data to the central location. In a disclosed embodiment the method is used to locate new terminals in a hotel or hospital system.

35 Claims, 11 Drawing Sheets

FIG. 3(a)

```
* * * * * * * * * * * * * * * *              302
*    SCREEN ALIGNMENT         *
*         - KEYS -            *
*   [ CH+ ]    UP             *              301
*   [ CH- ]    DOWN           *
*   [ VOL+ ]   RIGHT          *
*   [ VOL- ]   LEFT           *
*   [ BUY ]    SAVE           *
*   [ NO ]     NEXT           *
* * * * * * * * * * * * * * * *
```

FIG. 3(b)

```
ROOM NAME:  0000001
ID NUMBER:  123ABC0
AC OUTLET:  SWITCHED
INTERLACE:  ON

[ OK ]    TOGGLE OUTLET
[ CH+ ]   TOGGLE INTERLACE
[ BUY ]   SAVE
[ NO ]    NEXT
```

FIG. 3(c)

```
* * * * * * * * * * * * * * *
*                           *
*    - SYSMGR STATUS -      *
*         POLLING           *
*                           *
*    - CSTT STATUS -        *
*      ACKNOWLEDGED         *
*                           *
*      ANY KEY TO QUIT      *
*                           *
* * * * * * * * * * * * * * *
```

FIG. 3(d)

```
MEMORY DUMP -HEX 4000-  0000031FFFFFFFFF
4008-  000000F690040000
4010-  00013600B4717100
4018-  00000000FFFF02FF
4020-  80A02020202041EF
4028-  570CF801BD406F00
4030-  DE107D00E4209E00
4038-  027F00FF10FE00FB

PRESS [ CH+ ] OR [ CH- ]
```

© 1988 SCIENTIFIC-ATLANTA, INC.

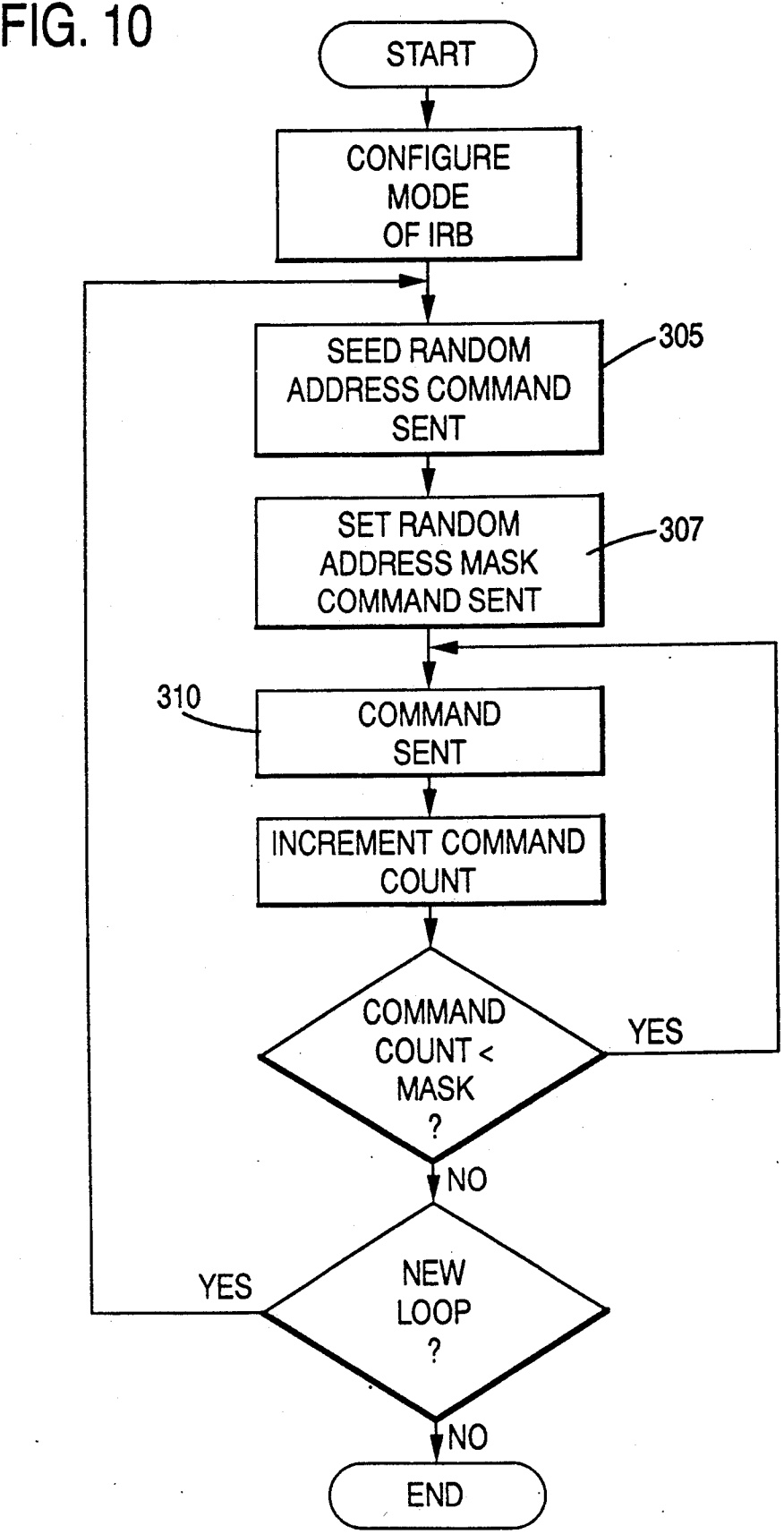

TERMINAL POLLING METHOD

This application is a continuation-in-part application of application Ser. No. 289,218 filed Dec. 23, 1988, now U.S. Pat. No. 4,987,486, of Lee R. Johnson, Elizabeth A. Smith, and Howard L. Myers and is related by subject matter to copending application Ser. Nos. 07/340,642 entitled "Cable Television Transaction Terminal"; Ser. No. 07/342,987 entitled "Storage Control Method and Apparatus for an Interactive Television Terminal"; Ser. No. 07/340,660 entitled "Interactive Room Status/Time Information System"; Ser. No. 07/340,967, now U.S. Pat. No. 4,994,908, entitled "Interactive Television Terminal with Programmable Background Audio or Video"; and Ser. No. 07/340,731 entitled "Terminal Authorization Method" filed concurrently herewith and each of which is hereby incorporated by reference thereto.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field

The present invention generally relates to a terminal polling method and, more particularly, to a method of terminal polling in which the effect of interference between terminals which responds at substantially the same time is reduced.

2. Description of the Relevant Art

Two-way interactive cable television systems are known for transmitting entertainment, information and data signals over a cable facility to a plurality of users. Data may be transmitted and addressed to a particular subscriber over a separate data channel or a so-called "in-band" data channel. In a downstream direction, addressed control data may represent services authorized to a particular terminal or control commands to that terminal. In an upstream direction from a terminal to the service provider or system manager location, control data may represent selections made by a user in response to a polling request or at the time of user selection.

In systems where many transmitters supply information to one receiving point, it is important to control transmissions so as to minimize the effects of mutual interference or collisions between a large number of transmitters. A number of prior art techniques have been developed to control such mutual interference. For example, it may be possible to pre-order transmissions from a plurality of transmitters such that each transmitter transmits at a unique, predetermined time after receipt of a command which requires a response. However, this method is inefficient when not all transmitters are required to respond or when transmitters are frequently added to or removed from a system.

A number of other prior art techniques are set forth in U.S. Pat. No. 4,409,592 to Hunt. In the slotted Aloha protocol, for example, collision effects are reduced and channel utilization increased by partitioning the common radio channel into slots of time equal to a packet length and having each station only transmit a packet at the beginning of a slot. In this way, overlapping transmissions are forced to completely overlap and channel utilization is thereby increased.

In carrier sense schemes, any carrier signal on the communication channel must be sensed by a station before it transmits a packet and if a carrier is detected, the transmission of the packet is deferred until the end of the carrier signal. This concept is well understood and has been used in voice aircraft radio communication.

Finally, collision detection schemes are based on the assumption that a station in the act of transmission can detect transmissions from other stations and abort transmission if an overlap is detected.

SUMMARY OF THE INVENTION

Accordingly, it is an object of the present invention to provide a method and apparatus for efficiently transferring data from a plurality of remote terminals to a central location over a communication network or path.

It is another object of the present invention to provide a method and apparatus for reducing the effects of collisions when a plurality of remote terminals attempt to communicate with a central location.

In accordance with the present invention, a technique is provided for mitigating the occurrence of collisions between a plurality of interactive data terminals coupled with a central facility via a common communication path wherein a random number generator at each terminal is controlled by signals from the central facility to randomly distribute the call back times of the terminals. The technique is particularly useful as part of a polling method associated with a hotel system consisting of a "system manager" at a central hotel location which communicates via an RF path with interactive terminals located in each hotel room. The in-room terminals consist of a TV set-top terminal (STT) which serves as a multipurpose device having a selection of input keys through which the guest may call for a variety of services, including pay TV programs and which further includes an interactive capability related to locally stored prompting screens displayed directly on the TV.

The terminal polling/collision minimizing scheme is based on each terminal having random number generator circuitry which is initially commanded by the system manager to produce randomly delayed response times when addressed. Should the system manager determine that collisions are occurring between the responses from the polled terminals, a new "masking" command is generated so that a new set of random numbers will be produced by each terminal. Illustrative apparatus for the random number generation includes a 16-bit clock driven counter whose output states are selected via a "mask" corresponding to the masking commands provided by the system manager.

BRIEF DESCRIPTION OF THE DRAWINGS

A more complete appreciation of the present invention and many of the attendant advantages thereof will be readily obtained as the present invention becomes better understood through the following detailed description with reference to the accompanying drawings.

FIG. 3 is a collection of four exemplary screens, three of which according to FIG. 3(a), (b) and (c) are for displayed on a television receiver associated with the terminal of FIG. 2 during an automatic installation mode of operation of the terminal and the fourth, according to FIG. 3(d), is for display during a terminal maintenance mode.

FIG. 10 is a flow chart illustrating system manager operation in accordance with the present invention.

DETAILED DESCRIPTION

Figure 1:
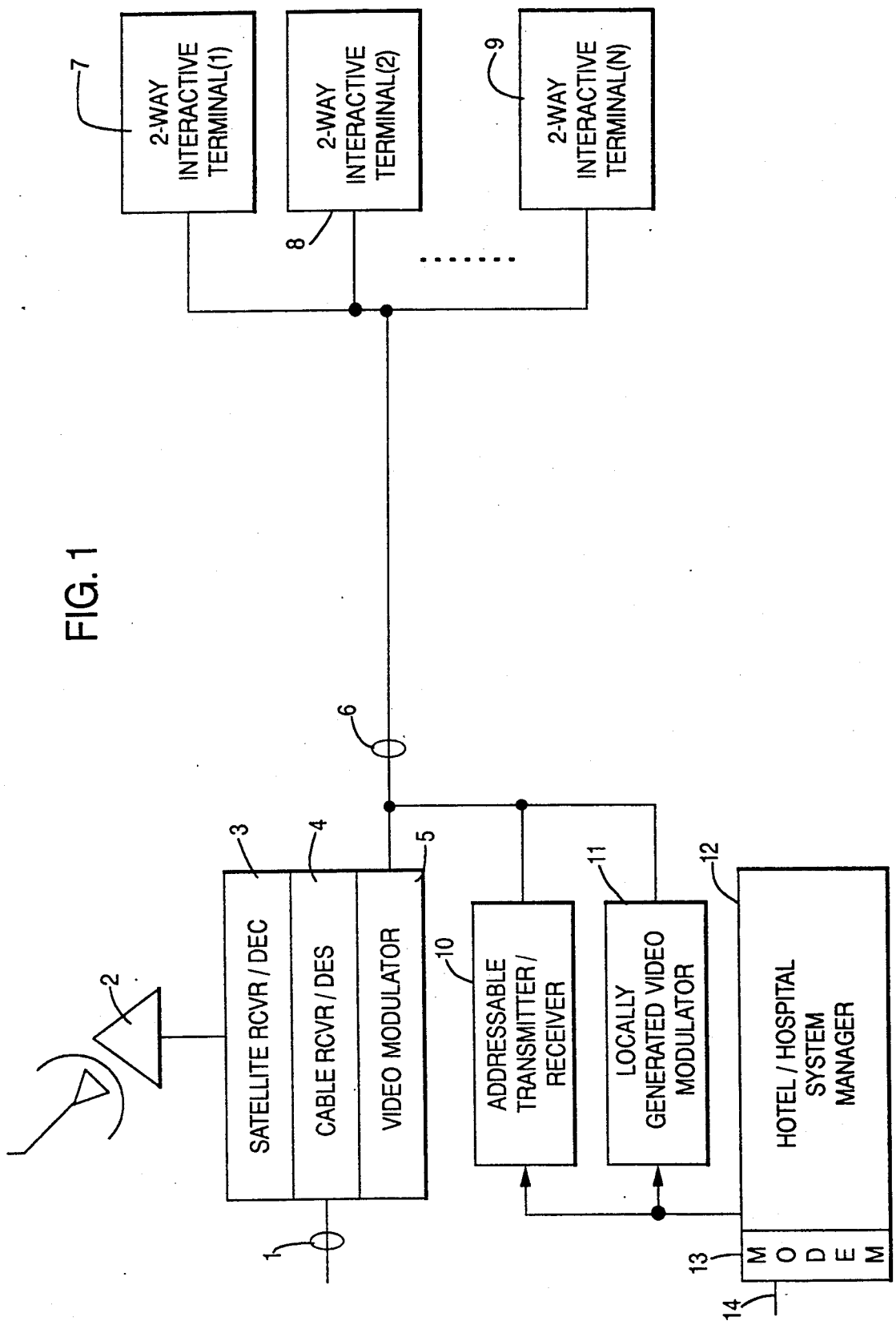
FIG. 1 is a block schematic diagram of an interactive entertainment system in accordance with the present invention applied in a hotel or hospital system environment.

FIG. 1 is a block schematic diagram of an interactive entertainment system in accordance with the present invention. The depicted embodiment relates to the system's application in a hotel or hospital system environment. However, the present invention is not limited in this respect. The present invention may be applied in any two-way interactive entertainment system involving a distribution network including trunk lines and feeder cables of optical or coaxial cable. For example, satellite receiver and decoder 3, cable receiver and descrambler 4, video modulator 5, addressable transmitter/receiver 10, locally generated video modulator 11, and system manager 12 may all be located at the location of a cable television system headend. In this example, coaxial cable or optical fiber transmission link 6 may couple the cable television headend to two-way interactive terminals 7, 8, or 9 of the entertainment system located at individual subscriber premises.

The embodiment of FIG. 1 is especially exemplary of the application of the present invention in a hotel or hospital entertainment system. In this instance, transmission link 6 may comprise a coaxial or optical fiber cable link between an entertainment control central and N terminals. For example, terminals 7, 8 or 9 may be located in particular rooms of the hotel or hospital.

In particular, at the system control center, a satellite signal may be detected by satellite antenna 2 and then received and decoded at satellite receiver/decoder 3 for distribution via modulator 5 over distribution cable 6 to the interactive terminals 7, 8 or 9 of the present invention. Additionally, a band of cable television channels received over cable facilities 1 is received and, if necessary, descrambled at cable receiver/descrambler 4. The descrambled video signals are then modulated at modulator 5 for distribution over distribution cable 6 to interactive terminals 7, 8 or 9. If desired, an optional scrambler may be provided for scrambling premium channel transmissions to interactive terminals 7, 8 or 9. Of course, terminals 7, 8 or 9, then, would include descrambler circuitry capable of descrambling the scrambled premium channel transmissions. Such circuitry is not shown in either FIGS. 1 or 2, but would, for example, be preferable in a system involving distribution of signals to remote subscriber locations.

According to the exemplary embodiment of FIG. 1, the hotel or hospital location may be linked to other hotels or hospitals via data link 14. Data may be received by system manager 12 over data link 14 via modem 13. In this manner, the hotel or hospital system manager may maintain current status of all features and all interactive terminals of an entertainment system comprising a plurality of hotels. For example, entertainment schedules may be distributed over the data link from a network control center where the entertainment schedule is composed. System manager 12 comprises a data processing unit and an appropriate memory for storing status and features associated with all terminals in the system. System manager 12 further controls the generation of video channels at modulator 11, if necessary, for transmission over distribution cable 6 to two-way interactive terminals 7, 8 or 9. In particular, locally generated video modulator 11 includes the capability to generate signals for actuating the display of character screens at terminal locations in response to the control of the system manager 12 in the event, for example, that the terminals are unable to generate the character screens themselves.

The generation of complete screens of characters for transmission to a terminal according to the present invention for display is not required because the terminal (discussed below in greater detail with reference to FIG. 2) includes its own character generator 204. Consequently, locally generated video modulator 11 is optional. Instead, system manager 12 generates commands to generate screens, and not the screens themselves, for transmission via addressable transmitter 10 to an interactive terminal in accordance with the present invention. In a "hybrid" system including terminals without character generators as well as terminals according to the present invention, locally generated video modulator 11 would be necessary. The screens generated either at the terminal or by way of modulator 11, for example, may relate to the provision of information to guests or patients about hotel or hospital services, respectively.

System manager 12 further controls an addressable transmitter/receiver 10 for transmitting addressed communications which are uniquely addressed to terminals 7, 8 or 9 and receiving communications at random times or in response to polling requests of terminals. The addressable transmitter 10 according to FIG. 1 may transmit addressed information on a separate data carrier, for example, at 108 megahertz and receive information transmitted in a so-called upstream direction from the terminals on another separate data channel at 25 megahertz for example. In an alternative embodiment, all downstream communications may be transmitted in-band or within a particular television channel transmission, for example, within the horizontal or vertical intervals of transmitted video signals. Consequently, the system manager 12 accomplishes in-band signalling by controlling data input into the video signals transmitted via either modulators 5 or 11. A separate data carrier for each direction of transmission may be preferred due to increased data carrying capacity. For upstream transmission, a telephone line or spread spectrum transmission may be employed as an alternative to a separate data channel.

In addition to specifically addressed data communications with the interactive terminals 7, 8 or 9, the system manger may also address communications globally to all interactive terminals, which global communications may or may not require a terminal to respond. Such global communications, for example, may be addressed to a global address representing all terminals in the particular hotel system or to a group address representing a group of terminals within the system having a commonality of interest.

Figure 1A:
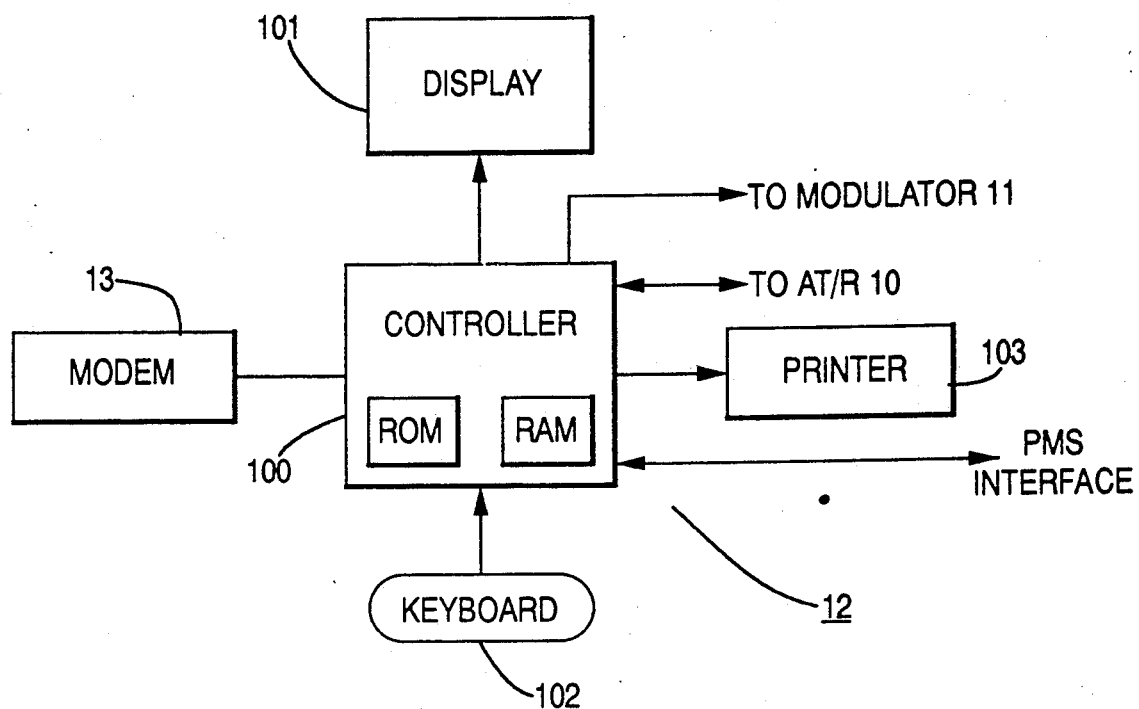
FIG. 1(a) is a block diagram of a system manager in the entertainment system of FIG. 1.

Referring to FIG. 1(a), system manager 12 particularly comprises a processor 100, an associated memory for storing control algorithms ROM, a read/write memory for storing as many as thousands of uniquely identified screens RAM, a display screen 101 and a keyboard 102 for screen design and modification. An optional printer 103 is provided for printing out room checkout bills in a similar manner as would occur at a hotel front desk during checkout.

Figure 2:
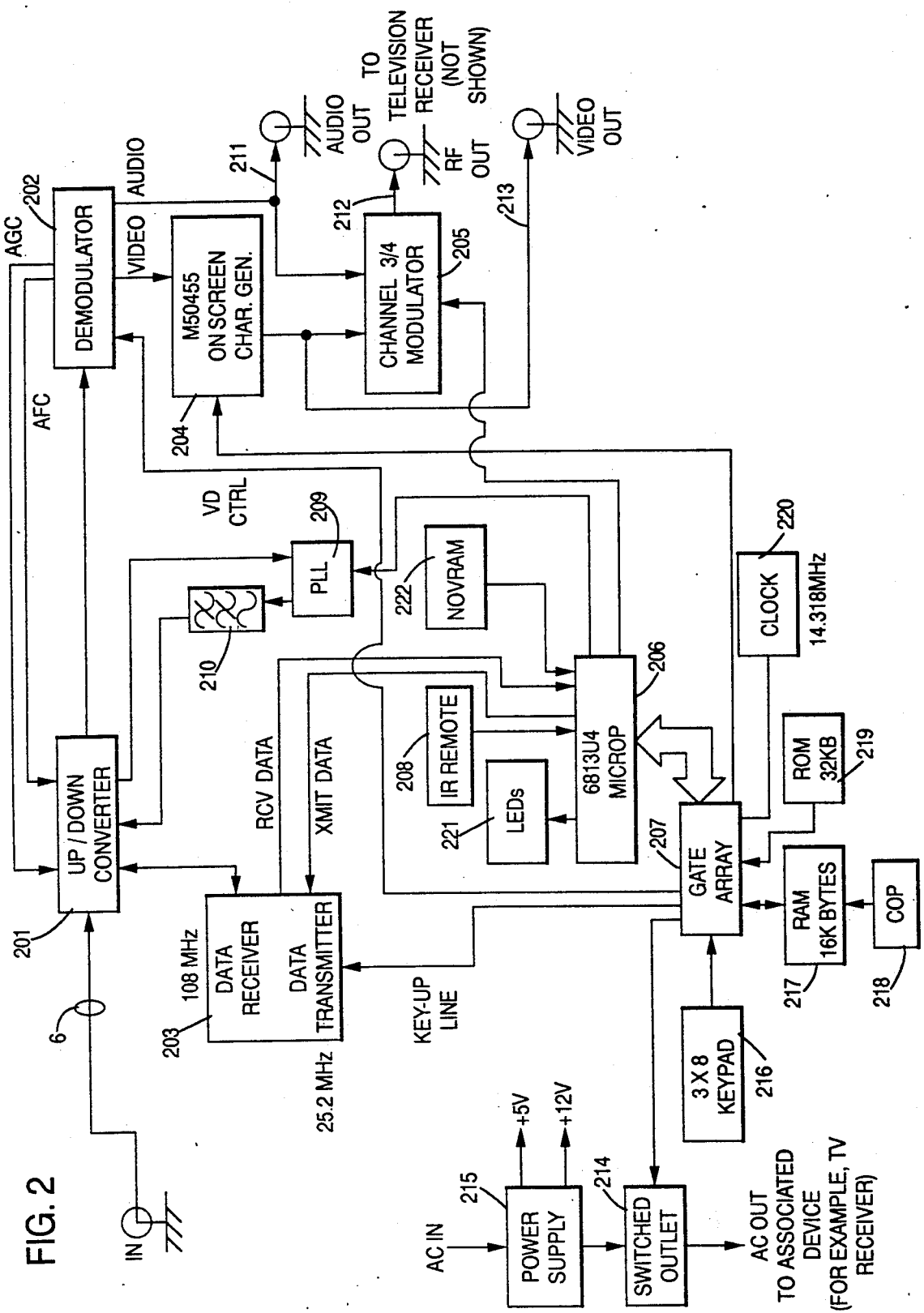
FIG. 2 is a block schematic diagram of an interactive terminal in accordance with the present invention.

FIG. 2 illustrates a two-way interactive terminal according to the present invention. The terminal is coupled via distribution cable 6 to video modulator 5, addressable transmitter/receiver 10, and locally generated video modulator 11, if provided, as shown in FIG. 1.

In particular, a two-way interactive terminal according to the present invention includes an up/down converter 201 for converting channels received over distribution cable 6 for display at an associated television receiver (not shown) or for transmitting data modulated to 25 megahertz by data transmitter 203 for transmission over distribution cable 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on-screen character generator 204 to channel ¾ modulator 205. In this manner, on-screen characters may appear superimposed upon an incoming video signal or displayed in the form of a teletext screen, for example, text on a colored background. Also at demodulator 202 the baseband audio channel is transmitted to audio output 211 or via channel modulator 205 to the television receiver at radio frequency. In addition, a baseband video output 213 may be provided from on-screen character generator 204 at video output jack 213.

Further details on the implementation of either background audio or video or both to accompany teletext screens generated at character generator 204 may be found in U.S. application Ser. No. 07/340,967 entitled Interactive Television Terminal With Programmable Audio or Video filed concurrently herewith and previously incorporated herein by reference.

The interactive terminal of the present invention further includes a processor 206 for controlling data transmission and reception at data receiver/transmitter 203. Processor 206 also controls character generation at character generator 204 via gate array 207. Processor 206 also controls via gate array 207 a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of the up/down converter 201.

Power is supplied via an alternating current input to power supply 215 which provides, for example, a +5 volt and a +12 volt DC input to the various components of the terminal requiring such power. Furthermore, the alternating current power input to power supply 215 may be provided via a controlled switched outlet 214 to an associated device such as the television receiver associated with the terminal. The state of the switched outlet 214 is controlled via gate array 207 by processor 206. For example, the switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided by gate array 207 for operation of the microprocessor 206 which may be a Motorola MC 6803U4 or for clocking other processes of the terminal. The on-screen character generator 204, for example, may be a Mitsubishi M50455 component. RAM 217 may comprise 16 kilobytes of memory and ROM 219 may comprise 32 kilobytes of memory.

In addition to character generation and screen display, LEDs 221 may, for example, indicate at least a power on condition or, additionally, an alternative display of tuned channel number or other data which may be displayed on a screen.

Figure 4:
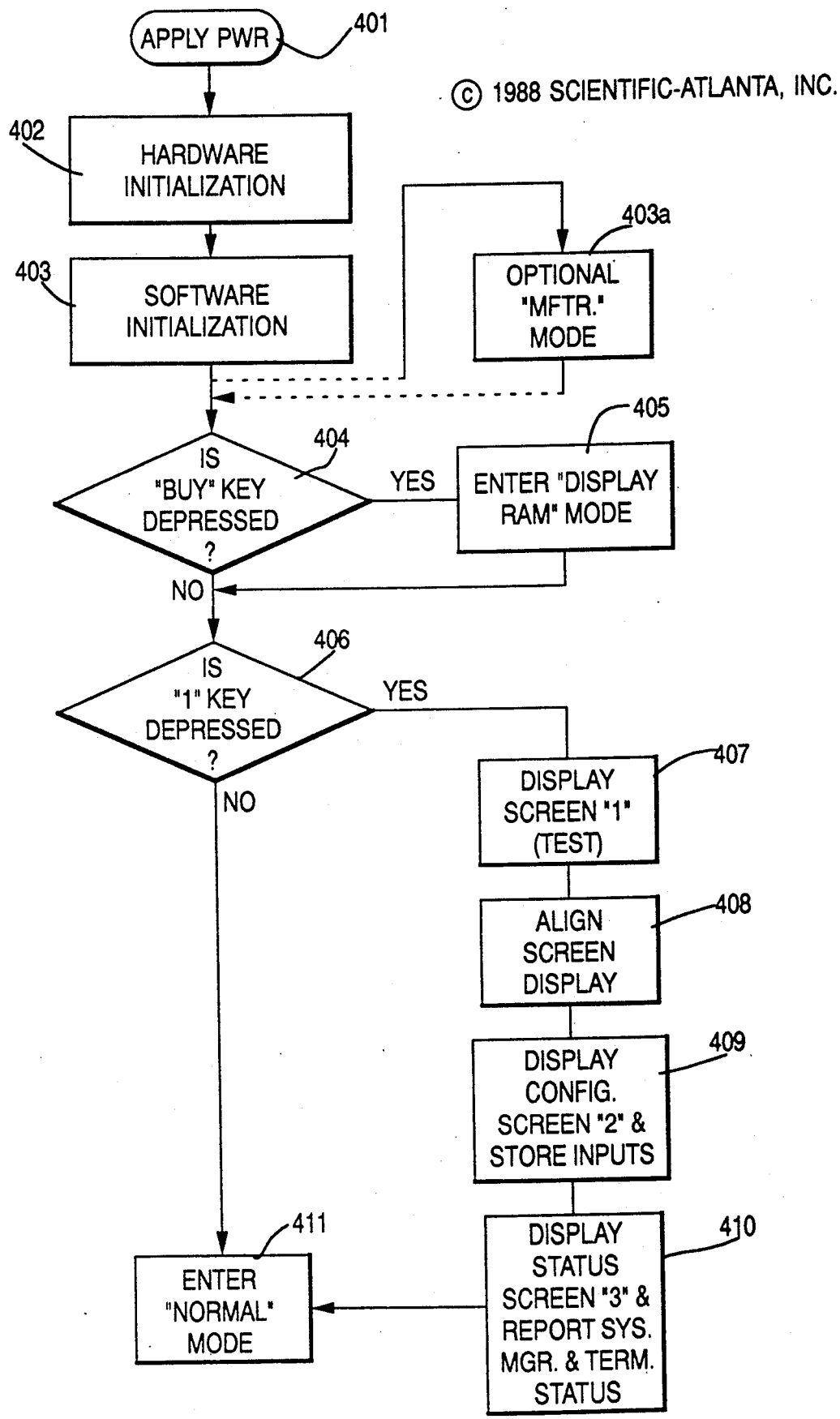
FIG. 4 is a flowchart of an algorithm of terminal software for accomplishing an automatic installation mode of operation or similarly implemented manufacturing or maintenance modes of operation.

Referring now to FIGS. 3 and 4, the operation of the terminal of FIG. 2 will be described particularly with reference to the flowchart provided in FIG. 4. Copyright protection is asserted for each of screens FIGS. 3(a)-3(d) and for the flowcharts of FIG. 4. When the user of the terminal or a terminal installer applies power to the power supply 215 of FIG. 2 as indicated at step 401 of FIG. 4, processor 206 begins initialization of various hardware components of the terminal. The hardware initialization routines of step 402 may be any of the initialization routines applied in the art of terminal initialization, such as those applied in data terminal initialization. Processor 206 checks the proper operation and communication and control of components of the terminal such as data transmitter and receiver 203, gate array 207, on-screen character generator 204, key pad 216, and infrared remote control receiver 208. At step 403, the software may perform self-diagnostic routines well known in the art so as to verify proper software operation. Control may then pass to step 403a and the processor may enter an optional manufacturing or factory testing mode which will be discussed below. The processor may also enter a maintenance or display RAM mode of operation indicated at steps 404-405, which will also be discussed below. The mode of operation is dependent on the particular depression of a predetermined key of keyboard 216 or the receipt of data entered via remote control receiver 208 within a predetermined period of time after the application of power at step 401. The predetermined period of time may, for example, be the time from the application of power at step 401 to the time step 406 is reached and so it may appear to the user as if the application of power and the display of a first installation mode screen are substantially simultaneous, i.e., within approximately one second of each other. The actuation of the "1" key, for example, is shown at step 406. If the "1" key has been depressed within a predetermined time after the application of power at step 401, a first display screen "1" is generated at step 407 by on-screen character generator 204.

Display screen "1" is a test screen shown in FIG. 3(*a*). This display screen as well as the display screen of FIGS. 3(*b*) and 3(*c*), actuated at steps 409 and 410, respectively, are stored in either read only memory 219 or nonvolatile RAM 222. Consequently, these screens are not dependent upon the System Manager of FIG. 1 in any way. Because the entry into an installation mode is dependent on two normally unperformed tasks such as plugging in power and the practically simultaneous depression of a particular key, the installation mode is protected against inadvertent actuation.

Alternatively, step 406 may be supplemented by a decision box (not shown) as to whether step 401 represents the first application of power. If yes, then control passes to step 407. If no, then a step such as existing step 406 requiring a "1" key depression is entered. Such an entry into the installation mode may facilitate installation without jeopardizing security as such a supplemental decision box would typically only be entered once in the life of a terminal.

FIG. 3(*a*) shows a first display screen for alignment of the display of an associated television receiver. Since all television receivers do not handle the display of teletext screens in the same way, screen alignment is often necessary. According to FIG. 3(*a*), outer perimeter 301 represents the boundaries of a screen display of the associated television receiver. A box of asterisks 302 represents the boundaries of the test screen for testing alignment. A terminal user or installer follows the commands provided by test screen 302 to effectuate proper screen alignment. Processor 206 may scan key pad 216 or receive input commands entered via infrared remote receiver 208. Processor 206 will ignore any inputs other than those depicted in FIG. 3(*a*). For example, to align the screen display up or down, the user or installer will depress the channel increment or the channel decrement key respectively. To align the screen display to the right or to the left, the user or installer will depress either the volume increase or the volume decrease key respectively. To save the particular screen alignment selected, the user or installer depresses a "BUY" key and the next screen is displayed. If the "NO" key is depressed before the "BUY" key, the previous screen alignment or default screen alignment setting will be saved. Actuating the "NO" key takes the user to the next screen shown in FIG. 3(*b*). Step 408 of the flowchart of FIG. 4 represents screen alignment as described above whereby either a default or a previously saved setting of screen alignment or a newly input screen alignment is saved in terminal memory. Optionally, a time out procedure may be provided whereby, if no action is taken, either the installation mode is quit or the next screen is displayed.

At step 409, a second screen of terminal configuration is displayed, screen 2. Screen 2 is shown in FIG. 3(*b*).

According to FIG. 3(*b*), a room name is requested as well as instructions from the user or installer as to whether the switched AC outlet 214 should be switched or placed in a permanently on condition. "Interlace:" is a request for input from the user or the installer as to whether teletext screens should be interlaced or non-interlaced. While non-interlaced is preferred, excessive screen bounce exhibited by the television receiver may require the display to be interlaced. However, non-interlaced screens generally exhibit little, if any, screen bounce compared with interlaced screen display.

The screen of FIG. 3(*b*) also may show the permanent unique identification number (or long address) of the terminal, in this example, 123ABCO (hexadecimal). If a user is to install a terminal and to secure the terminal's identity from piracy by the user of premium services, it may not be appropriate to display the unique terminal identification number. Also, in a user installation environment, the room name may be insufficient to uniquely identify the user's location and other information must be entered related to the location of the terminal. For example, in such a scenario, the user's name, address and credit information, i.e., credit card data, may be requested by this screen. Furthermore, the "interlace request" may require explanation to an unsophisticated user.

It should be noted that by assigning new functions to existing keys CH+, CH−, Vol+, Vol−, BUY, etc., the present invention permits programmable assignment of functions to keys which may have little or no relationship to the key labeling. Furthermore, by reinforcing the assigned key function by means of a screen display, a user or installer may feel comfortable with their selection of a particular key for performing a non-indicated function. In other words, the combination of screen display and programmable keys creates a user friendly interface between the user or the installer and the terminal.

Returning now to FIG. 3(*b*), "Room Name:" requests the entry of a non-zero room identifier. The System Manager may be programmed to refuse acceptance of a room name comprising all zeros. Consequently, a terminal reporting a room name of all zeros will be denied entry into the system. The room name is entered by depressing numeric keys one at a time until the number is shifted into the seven indicated positions from right to left. Actuating the "BUY" key will save the displayed terminal configuration and actuate display of the next screen. Actuating the "NO" key will preserve the existing status and enter the next screen, FIG. 3(*c*). If an invalid name has been entered, the "BUY" key will be ignored. A time out, if provided, will actuate the next screen or quit the installation mode.

Referring now to FIG. 3(*c*), a system manager, according to FIG. 1, may be in the process of polling a terminal, i.e. requesting or accepting transmissions from the terminal or configuring the terminal by transmitting, for example, channel assignments, screen generation commands, and/or features to the terminal for storage in memory. The "Sysmgr Status", then, is either "POLLING" or "CONFIGURING" when the system manager is active. If the system manager is down or is not communicating with the terminal for any reason, the "Sysmgr Status" is indicated as "INACTIVE." If either "POLLING" or "CONFIGURING" are displayed, the user or installer at least knows that the system manager is transmitting to the terminal.

The status of the terminal is either UNCONFIRMED or ACKNOWLEDGED. Typically, in a global command related to initial system entry, a system manager requests a newly installed terminal to transmit at least its identification and location name. If the system manager recognizes a previously unconfigured terminal or a new name not previously entered in the system, the system manager enters the new name into its memory along with configured features such as the status of the switched power outlet 214.

The third screen according to FIG. 3(c) is only to provide a visual indication to the user or the installer of system manager and terminal status. The processor 206 and system manager will interact, upon initial installation, regardless of whether the third screen is displayed until the terminal is entered into the system and the terminal entry is acknowledged if a valid room name or related data has been entered. The actuation of any keyboard key will quit the installation mode.

In an alternative embodiment, all three screens may comprise one screen provided the screen does not become too "busy" to be user friendly. For example, with the advent of high definition television and wider screens, it may be possible to condense the number of screens employed for an installation mode of terminal operation.

In an alternative embodiment, a time out may be associated with each screen such that, if no keys are depressed, the installation mode is eventually quit and no actions taken if no room name is entered.

Referring again to FIG. 4, at step 404, it may be possible to implement a "maintenance mode" of operation comprising steps 404 and 405, for example, if desired, in a similar manner to the implementation of the "installation mode" of steps 406-410. Instead of depressing the "1" key within a predetermined period of time, a "BUY" key actuation may be recognized within a predetermined period of time after the application of power and at some point after softward initialization has at least begun at box 403. If the "BUY" key is depressed within a predetermined period of time since power application, a screen such as the screen of FIG. 3(d) may be displayed for showing memory status. One can page through the memory by depressing CH+ or CH− and may toggle from hexadecimal to ASCII format by depressing another key, for example, the "OK" key.

Furthermore, in a manner similar to the mode of access described by U.S. Pat. No. 4,792,972 which issued Dec. 20, 1988, and in accordance with step 403a, a factory testing or "mftr" mode of operation may be entered by the entry of a special code via the infrared remote link receiver 208. In practice, step 403a need not be positioned as shown since there is no required relationship between step 403a, initialization and the application of power. It may be entered any time the special code is received, for example, during a normal mode of operation according to step 411. This special code, for example, may not be one that is generatable by either the terminal keypad 216 or an infrared transmitter normally provided with the terminal. In this way, only factory personnel may enter the factory mode unless, for example, an installer or user is provided with a special transmitter which can generate the special code.

Figure 5:
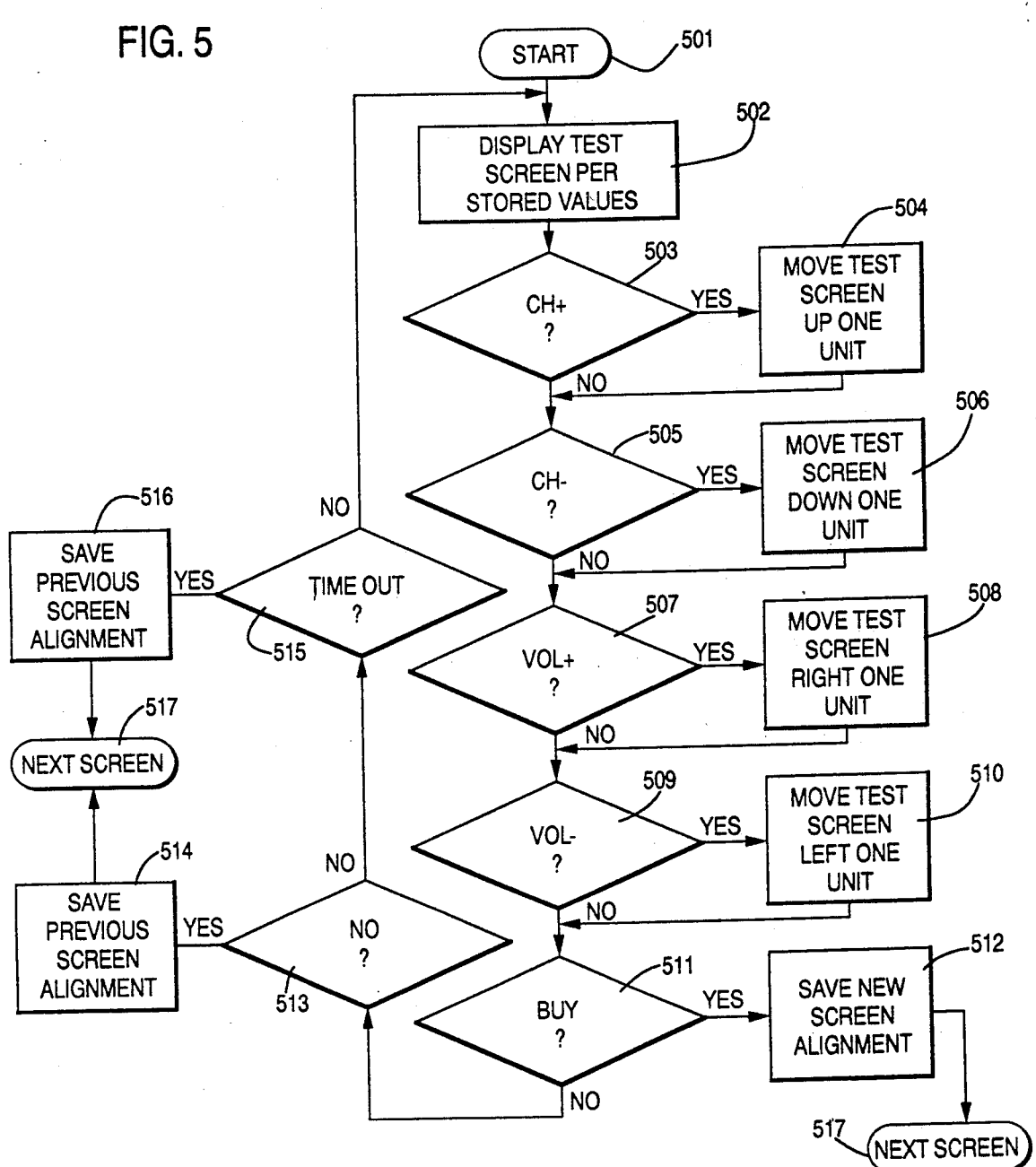
FIG. 5 is a detailed flowchart of processor operation related to screen alignment.
Figure 6:
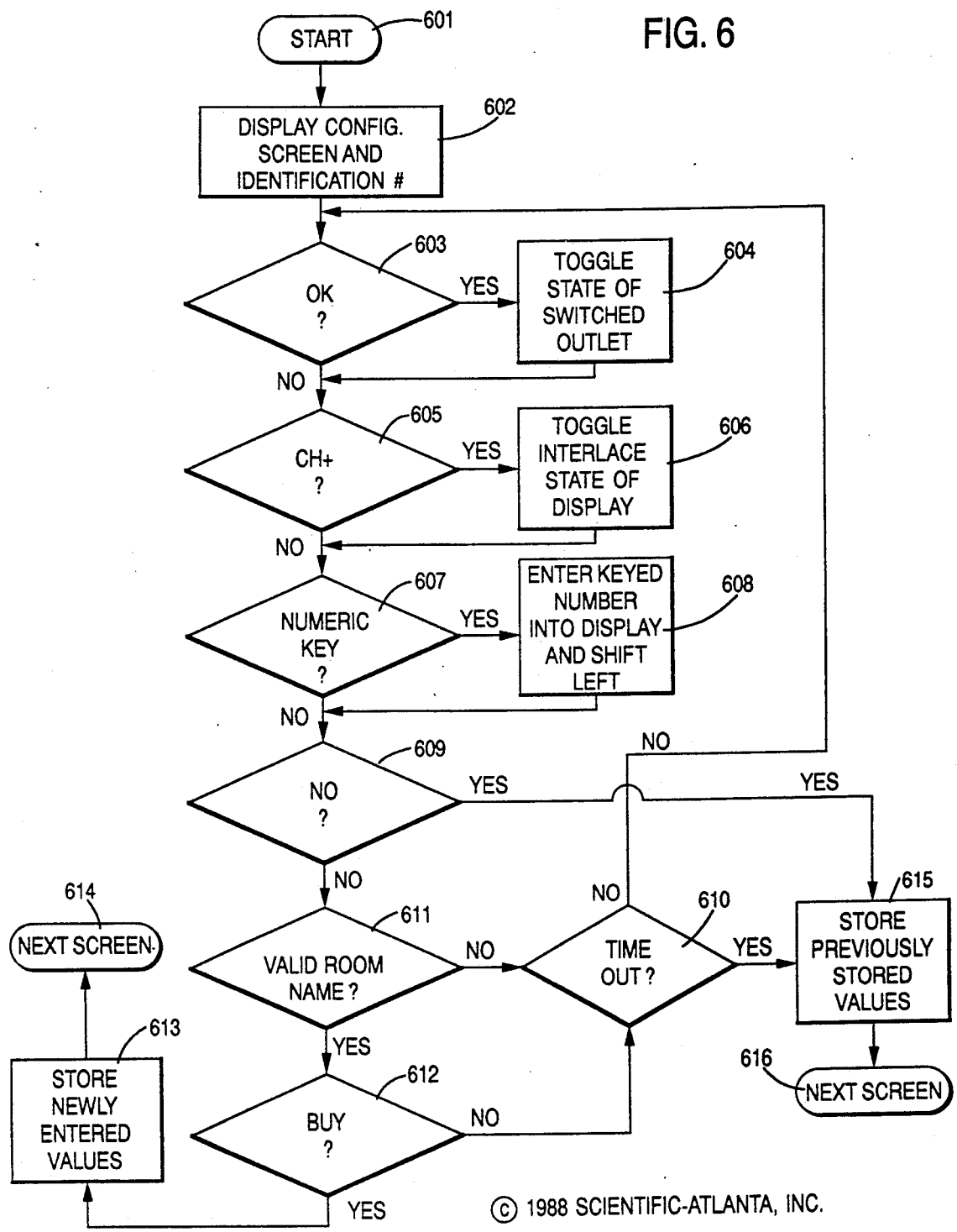
FIG. 6 is a detailed flowchart of processor operation related to terminal configuration.
Figure 7:
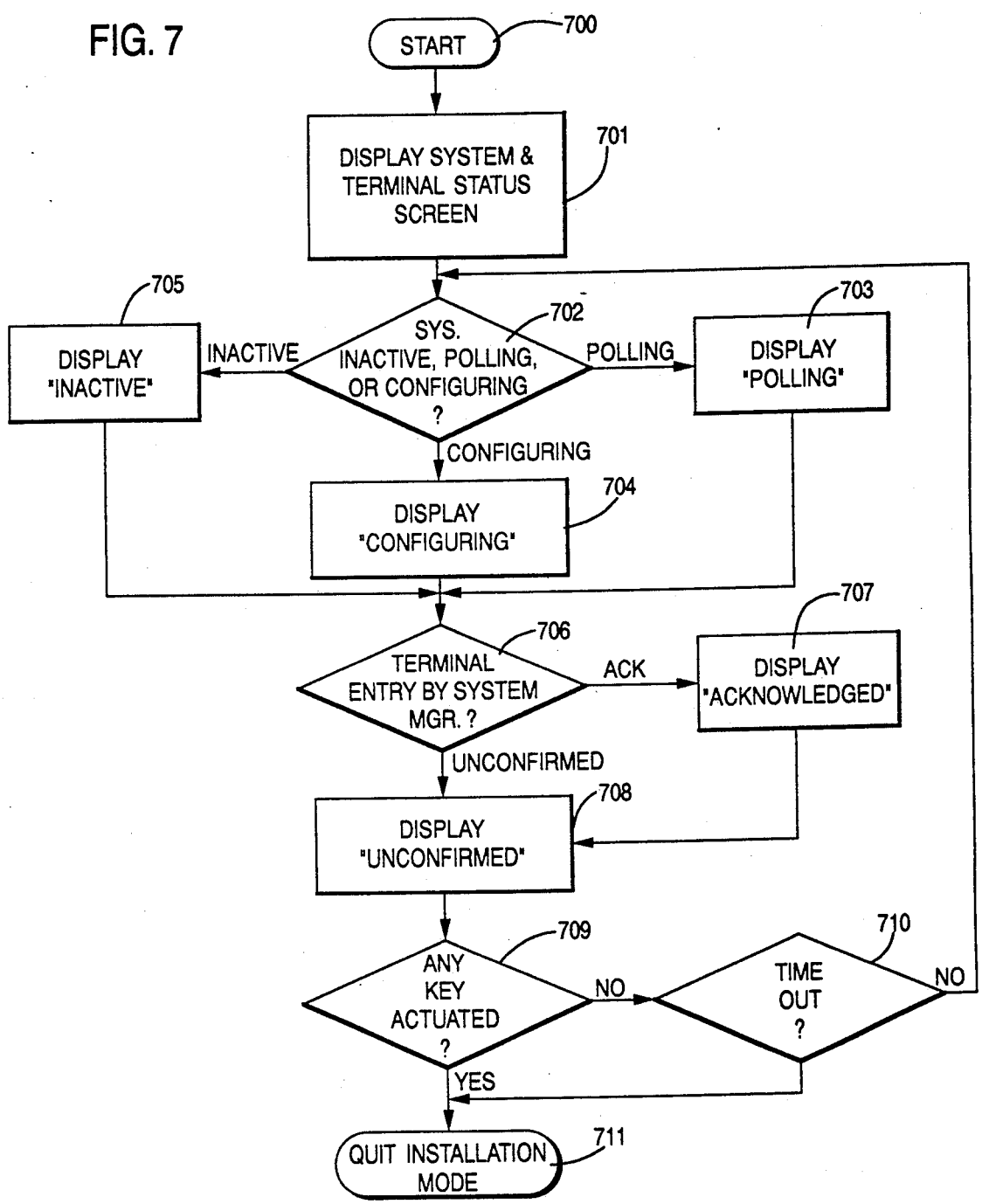
FIG. 7 is a detailed flowchart of processor operation related to system status and acknowledgement of system entry.

Referring now to FIGS. 5-7, the installation mode of operation of a terminal according to the present invention will be demonstrated in still greater detail. Copyright protection is asserted for each of flowcharts of FIGS. 5-7. FIG. 5 relates to steps 407 and 408 of FIG. 4 and test screen "1" of FIG. 3(a). Step 501 is entered from step 406 of FIG. 4 after a predetermined period of time has lapsed until the actuation of a "1" key measured by the duration of accomplishing initialization routines or directly after initialization if this is the first application of power to the terminal. Other means for accomplishing a predetermined period of time may include the use of clock 220 to obtain a predetermined count since power application. At step 502, test screen "1" is displayed in a position according to a default screen alignment position or a previously stored position. Steps 503-510 relate to the incremental movement of the test screen by one unit, for example, one horizontal or vertical line, up or down, to the right or to the left.

If, at step 511, the "buy" key is depressed, then, the new screen alignment is stored. If not, and the "No" key is actuated at step 513, the previous screen alignment is stored at step 514. If a certain period of time has elapsed with no activity at step 515, the previous screen may be stored at step 516. The next screen, screen "2" of FIG. 3(b), is entered at step 517 having saved either the previous screen alignment or a newly entered screen alignment.

Referring now to FIG. 6, step 601 is entered from step 517 of FIG. 5. The screen according to FIG. 3(b) is displayed at step 602 and, optionally, so is the terminal identification number. Steps 603-606 relate to configuring the status of the switched outlet 214 and to the interlaced or non-interlaced character of the display.

Any number key at step 607 will actuate a shifting to the left of numbers already entered in the room name field of FIG. 3(b). If a credit card number or other personal information is required of a user, then, another key may toggle to numeric entry of a credit card choice and then to a credit card number or to entry of any other number or item selection according to other screens (not shown). The depicted keyboard 216 is not equipped with alphabetic keys and comprises only eighteen or twenty-two keys of the required twenty-six. However, means are known for alphabetic entry of characters from a limited capacity keyboard which may be employed or the keyboard may be expanded by four keys if alphabetic input is required.

If a non-zero room name is entered at step 607, then, system entry can be obtained for a terminal via a path including steps 609, 611, 612, 613 and 614. Otherwise, if the room name is invalid at step 611 and there has been no time-out at step 610, the terminal will remain in a loop in which it will refuse to recognize a "BUY" key. If the "NO" key is actuated at step 609 or if there has occurred a time-out at step 610, previously entered values are stored and the next screen extended at step 616. If, on the other hand, a valid room name has been entered at step 611 and the "BUY" key has been actuated at step 612, then the room name and the terminal configuration are stored at step 613 and the next screen entered at step 614.

Referring now to FIG. 7, screen 3 according to FIG. 3(c) is displayed showing the current status of the system manager and the terminal. Steps 702-705 relate to display of the current status of the system manager. Steps 706-708 relate to display of the current status of entry of the terminal into the system. Any key actuation at step 709 actuates a quitting of the installation mode at step 711 or a time-out may be implemented according to step 710.

The present invention relates to a technique for polling a plurality of the above-described terminals, particularly to the above-mentioned global command related to initial system entry. In order to describe the present invention, the polling technique will be discussed below in a hotel environment including a pluarlity of terminals placed in hotel rooms. Certain rooms or suites, for example, may include more than one television and associated terminal. Further although the discussion below is in terms of a hotel environment in which it is desired to determine the addition of new terminals to the system, the invention is broadly applicable to data transfer systems in which a plurality of remote transmitters communicate with a single or small number of central units over a communication path or network.

In order to identify each terminal, an address is associated with each terminal or in-room box (IRB). In the discussion below, the term In-Room Box (IRB) or box will be used to denote a terminal 7, 8, or 9 according to FIG. 1 or FIG. 2. There are two types of IRB addresses: a long address and a short address. Since the IRB contains no DIP switches for setting the long address, the long address is set at the time of manufacture and is generally not altered "in the field". Each box manufactured includes a unique long address. The long address consist of three bytes and has a permissible range of 1 to 8,388,607 (0x7fffff), i.e. $2^{23}-1$. The notation "0x" will be used throughout the specification to denote hexadecimal notation. To minimize communications overhead, a short address may be configured by the system manager. The short address is treated identically to the long address. The short address is site specific and is stored so as to prevent its erasure due to power failure, etc. The short addresses have a permissible range of 1 to 32,767 (0x7fff), i.e. $2^{15}-1$.

To differentiate between the long and short address formats, the first bit of the first address byte is SET for long addresses and CLEARed for short addresses. Alternatively, the first bit of the first address byte may be SET for short addresses and CLEARed for long addresses. Utilizing such a protocol, there is no interaction between the short and long address formats.

It should be emphasized that the long and short address ranges listed above are representative of one embodiment of the present invention and the invention should not be limited in this respect.

The long address is stored in non-volatile memory (NVM) so as not to be erased. In a preferred embodiment, several methods are provided to determine the long address of a particular IRB. First, as described above, when the second installation mode screen is displayed, the ID number field may display the long address. (See FIG. 3(b)). Second, the system manager may determine the long address by issuing a "report long address" command to the IRB. This command will prompt a response from an addressed IRB regardless of the IRB address to which the command is sent. In a preferred embodiment the IRB will return four bytes, the first byte being zero.

A global address is a fixed address associated with each IRB. In a preferred embodiment, the global address is fixed at 0x7ffc. All units recognize a global address to aid in sending system-wide commands. In a preferred embodiment, no response is normally given to commands sent to the global address. The global address is intended for use, for example, in handling schedule changes, sending time of day transactions, sending common screens, etc. If a command is issued to the global address, an internal flag is set inside the IRB to indicate that a global type command has been received. The flag may be used by the system manager to verify receipt of global configuration commands and may subsequently be cleared.

A secondary or group address is also issued by the system manager. The secondary address may also be used to issue commands to the box and is handled by the IRB as a second global address. In order to maximize system performance, more than one IRB may share the same secondary address. This permits the control of multiple IRBs with a single transmit cycle.

The configuration address is a special address associated with each IRB. In a preferred embodiment, the configuration address is fixed at 0x7ffb. If a command is sent to the configuration address, it is not automatically acted upon. Several conditions must be met as explained below.

For other applications of the present terminal polling method, other global addresses such as 0x7ffd or 0x7ffe, for example, may be reserved.

Due to the difficulty in tracking the room address assignments, and the tedious and error prone nature of entering address assignments into the system manager by hand, the present invention discloses a scheme for automatically recovering this information from the IRBs.

The polling of IRBs typically takes place during a night test or after installers have added new IRBs to the system. During night test polling, a 'set configure mode' command is sent to the IRBs to place each IRB in the configure mode. When the newly installed IRBs are attempted to be located in the second scenario, only those new IRBs will be in configure mode. In a preferred embodiment, the newly installed IRB is in configure mode after the installer exits the installation screens 3(a), 3(b), and 3(c). Alternatively, the IRB may be in configure mode on power up.

Placing the system manager in the Auto Configure mode will initiate the process of determining whether any new IRBs have been added to the system. The system manager maintains an address assignments list in memory as a record of all IRBs which have been configured. If an IRB is detected to be one not currently in the address assignments list, the system manager will automatically address the IRB using its long address to take the IRB out of configure mode and assign it an unused address for short address identification. The system manager will then determine the room name and check the IRB's switched outlet status and record whether the outlet is in the ON or OFF state.

Figure 8:
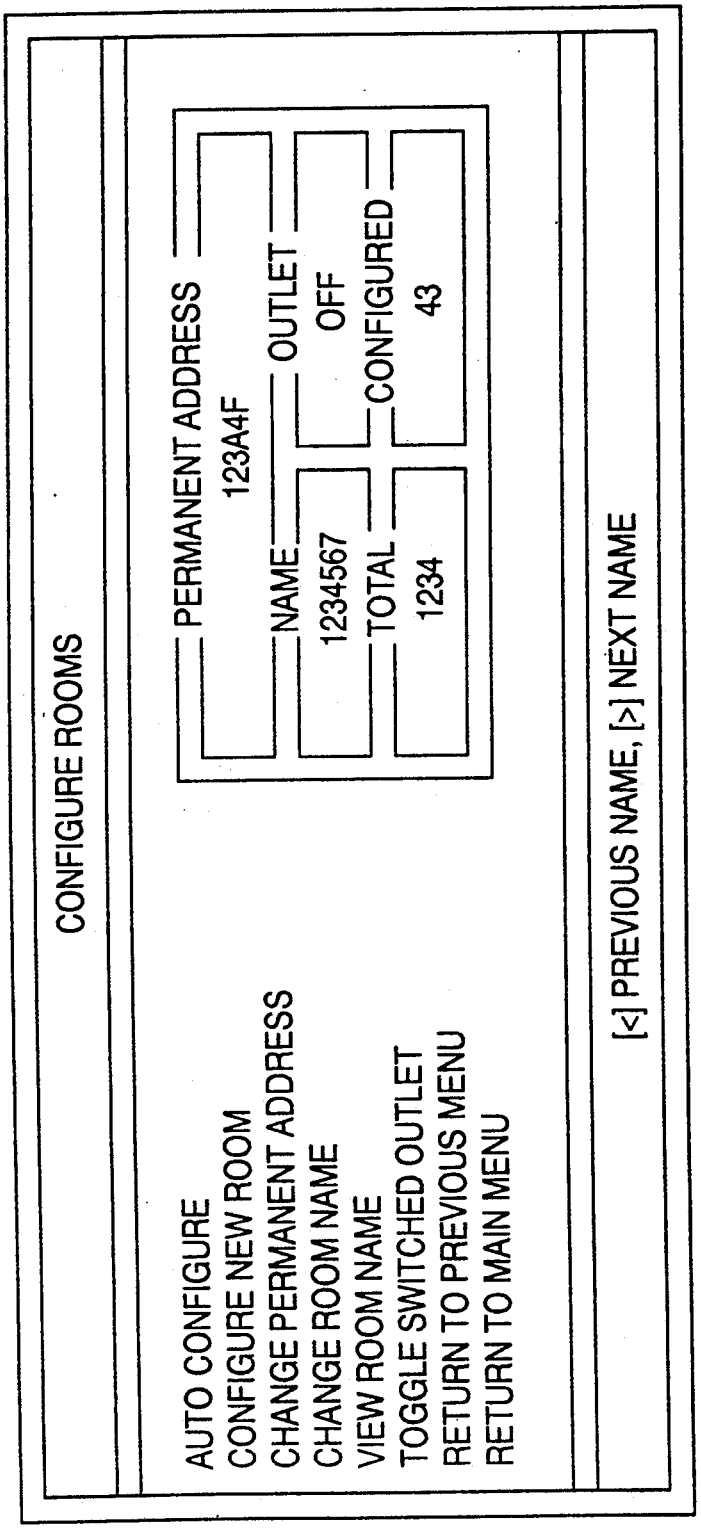
FIGS. 8 and 9 are flow charts illustrating the operation of the present invention.

FIG. 8 depicts a system manager screen which may be utilized with the present invention. When this screen is first called up, the total number of IRBs and the number of rooms configured the last time an Auto Configure operation was executed will appear in the corresponding boxes 'Total' and 'Configured' respectively. When Auto Configure is activated, a count will be kept of all new rooms configured throughout the process. This count of newly configured IRBs will appear in the 'Configured' box. The long (permanent) address, name, outlet status and total will also change as new IRBs are located and configured to provide a visual indication of what the system is currently doing. A flashing message will appear just under the 'Name' and 'Total' boxes stating "Auto Configure In Progress" and will disappear when the process is finished. As noted above, Auto Configure is run as part of a night test, a period of time between, for example, 2 a.m. and 6 a.m. when the terminals are for the most part inactive.

As described above, upon installation, the installer uses a special screen (see FIG. 3(b)) in the IRB to enter a 7 digit number or "name" into the IRB memory. In a preferred embodiment, this procedure may only take place if the system manager is inactive or in the configure mode. This number is preferably the number of the room in which the IRB is located. This technique provides a mechanism for identifying in which room an IRB is located.

The long address is the only fixed identification associated with the box. Since there are potentially eight million addresses, it is impractical to poll every long address to attempt to locate new boxes. Instead, a random address is generated in every IRB utilizing a free-running counter in the microprocessor. This is accomplished by means of a "seed random address" command. This command prompts each IRB to retrieve the current count of an internal free-running 16 bit counter. Thus, a random address between 0 and 65535 is generated. It will be apparent that other counters may be utilized in accordance with system requirements and thus the random address range may vary.

In order to minimize the time required to locate IRBs, the range of the random addresses may be altered by means of the "set random address mask" command. To set an address range of 0 to 63, for example, the mask is set to 63 or 0x3f. This will cause an IRB to respond to commands sent to the configuration address (or any other special global address for other applications) one time for every 64 commands. The mask value should be chosen to be one less than a power of 2, for example, 3, 7, 15, 31, ... 127, 255, 511, ... ,32767, 65535.

While in configuration mode, the IRB will increment and check its random address as discussed in greater detail below whenever a command is received at address 0x7ffb, i.e. the configuration address. An IRB will remain in the configure mode described above until it is addressed by the system manager using the correct long address. Once the IRB is successfully addressed, it is taken out of the configure mode and no longer responds to commands sent to its configuration address.

In accordance with the invention, each time a command is received at the configuration address of an IRB in configure mode, the current seed number or random address is incremented by a predetermined value. As used herein, "increment" refers to either a positive or negative change in the random address. In a preferred embodiment, the predetermined value of the increment is one. This new seed number is "anded" with the current mask value and the result compared to zero. It is to be understood that the "anding" of the random address with the mask is merely illustrative of a preferred embodiment and the invention should not be limited in this respect. Other types of logic functions may be utilized. If the result of the comparison is zero, the command is processed and acted upon. If the command is, for example, "report long address" and another IRB does not respond at the same time, the system manager should receive the long address of that particular IRB. If the IRB has not previously been configured and is not found in the list of previously configured IRBs, the newly found IRB is added to the list. The system manager will then send a command to the long address to take the particular IRB out of the configure mode. If the IRB is found in the list, the system manager will send a command to the long address to take the IRB out of configure mode. Utilizing this procedure, most of the IRBs will be eventually located.

It is possible that collisions may occur if more than one IRB responds at the same time. This is undesirable since not all of the IRBs are located as a result. Further, once a "loop" has been completed, it is likely that repeating the loop will result in the same collisions from the same IRBs responding at the same time. IRBs which responded at the same time in a previous loop will likely respond at the same time in a subsequent loop. A loop shall be defined as the transmission of a predetermined number of global commands determined by the present mask size.

In order to overcome this problem, a reseeding process is introduced. It is likely that the crystal oscillators associated with each IRB will have drifted sufficiently out of phase since the initiation of the previous loop to cause the internal counters of the IRBs to drift with respect to each other. Thus, when the reseed command is issued, the new seed random address will likely be different in IRBs that collided in the previous loop. In this manner, IRBs which were not located in the first loop will likely be found.

The natural logarithm of hit ratio, i.e. the fraction of boxes which will respond during a particular loop may be found utilizing the empirically verified equation $$h = \ln\left(\frac{b}{n-1}\right) + b\ln\left(\frac{n-1}{n}\right) \quad (1)$$

where b is the number of boxes and n is the mask number plus one. The hit ratio is then given by $$hr = e^h \quad (2)$$

The number of IRBs found is given by (3)
number found = $hr \times n$

The number of IRBs remaining is therefore (4)
number remaining = $b$ − number found Table I sets forth the results when b=300 for various mask values.

TABLE I

| Mask | 15 | 31 | 63 | 127 | 255 | 511 | 1023 | 2047 | 4095 |
|---|---|---|---|---|---|---|---|---|---|
| hr in % | 0 | 0 | 4.2 | 22.5 | 36.4 | 32.7 | 21.9 | 12.7 | 06.8 |
| # boxes responding | 0 | 0 | 2 | 29 | 93 | 167 | 224 | 259 | 279 |

Table I illustrates that the maximum hit ratio is 36.4% for 300 boxes. Thus 93 of the 300 IRBs (31%) will respond during a loop with a mask of 255. It can also be seen that if the loop is executed with a mask of 4095, 279 (or 93% of the boxes) will respond. Thus the response rate is three times that when a mask of 255 is used. However, a loop with a a mask of 4095 takes more than 16 times longer than a loop with a mask of 255 if commands are sent at a substantially uniform rate during a loop. By utilizing a mask for each loop which generates the most favorable hit ratio, the time for all of the boxes to respond may be minimized. In general, the above procedure recovers approximately ⅓ of the remaining boxes with each loop.

As more boxes are found, the mask value is adjusted. Thus, in the above example, 93 of the 300 boxes respond in the first loop, leaving 207 boxes which have yet to respond. The mask should thus be changed from 255 to 127. Again, the effect of changing the mask is to reduce the time required to complete a loop by a factor of approximately two. In a currently preferred embodiment, the lowest mask value is 0x0f or 15. This limit is based on the maximum number of new units expected to come on line during one pass through the loop. It will be apparent to those of skill in the art that other limits may be set or all mask including 1 may be utilized in accordance with the requirements of a particular system.

The above-described procedures will be explained in more detail with reference to FIGS. 9-11.

Figure 9:
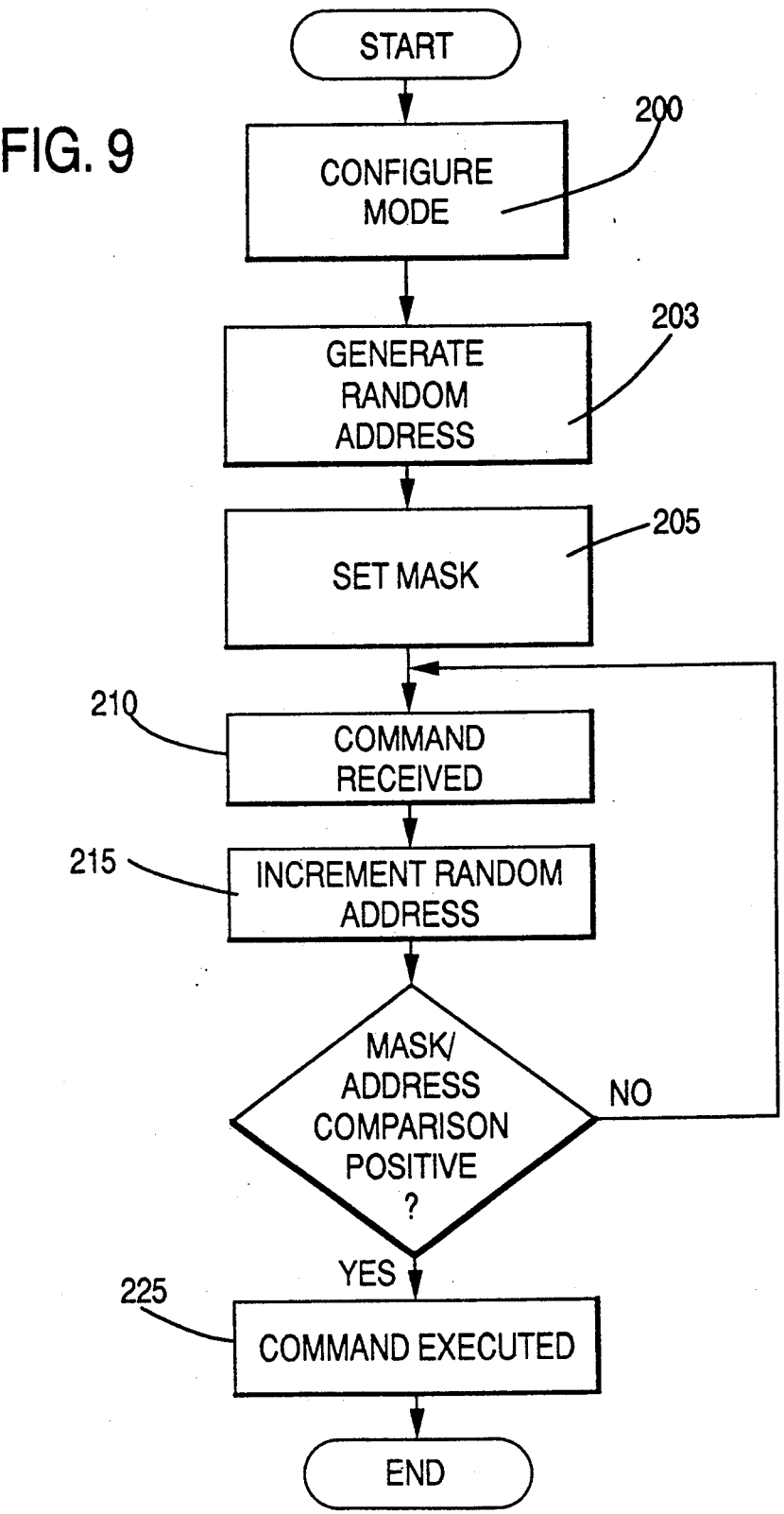

FIG. 9 is a flow chart illustrating the present invention. At step 200, the IRB is placed in the configure mode. As noted above, this may be accomplished on a system-wide basis during a night test via a "set configure mode" command from the system manager. Alternatively, an IRB may be placed in configure mode after the installer exits the installation screens described above. At step 203, a random address is generated in the box in response to a "seed random address" command by retrieving the current value of an internal 16 bit counter. At step 205, a random address mask is set in response to a "set random address mask" command. The mask determines how often a box will respond to commands addressed thereto.

When a command sent to the configuration address of the IRB is received as at step 210, the current seed number is incremented by a predetermined value at step 215. In a preferred embodiment, the seed is "anded" with the mask as will be explained below with reference to FIG. 11. If the result of the comparison is positive, i.e. zero, control passes to step 225 and the command is executed. If the result of the comparison is not positive, i.e. other than zero, the IRB awaits the next command addressed to its configuration address.

FIG. 10 is a flow chart illustrating the system manager operation in the present invention. At step 305, a "seed random address" command is sent to the boxes to generate random addresses within the boxes. Next, a "set random address mask" command is sent to the boxes to set the address mask as step 307. At step 310, a command is sent to the configuration address of the boxes. In a preferred embodiment, the commands are sent at relatively fixed intervals, for example approximately every tenth of a second, although the invention is not limited in this respect. After each command is sent, a command count is incremented by one. The command count is then compared with the mask value. If the command count is less than the mask value, the command is resent by the system manager after a time period corresponding to the relatively fixed interval has elapsed. If the command count is equal to the mask value, the loop is ended.

As noted above, repeating the loop, if necessary, will likely result in the same collisions, if any, from the same boxes responding at the same time. Thus after the loop is completed, control returns to step 305 and another "seed random address" command is sent if a new loop is required. It is likely that the crystal oscillators will have drifted sufficiently out of phase to cause the internal counters to drift with respect to each other. Thus, the new seed addresses will likely be different in the two boxes that collided in the last loop.

Figure 11:
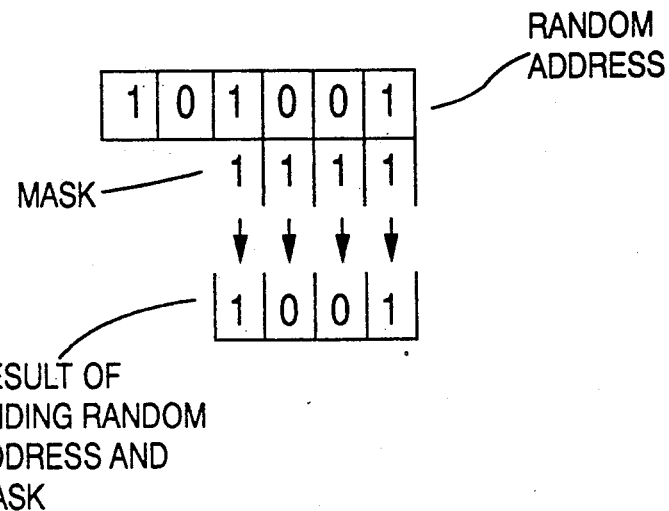
FIG. 11 is a diagram illustrating the ANDing of a random address with an address mask.

FIG. 11 illustrates the process of "anding" the random address with the mask. In the Figure, the random address is 101001 and the mask is 1111. Each bit of the random address is anded with the corresponding bit of the mask. If the result of such comparison is 0, the comparison is positive and the command is executed. For example, utilizing the above random address, the mask would have to be 0110 for a command to be executed. However, it will be noted that this mask would also cause the random address 111001, for example, to attempt to transmit at the same time as a box having a random address of 101001. This would result in a collision. It can be seen that for the address 101001, there is exactly one value between 0 and 63 for which a response will be sent. Thus, with a mask of 63, a response will be transmitted once every 64 commands sent by the system manager.

In order to allow for IRBs which for some reason do not respond during auto-configure, the system manager of the present invention permits the manual insertion of a new IRB into the system by entering the name and long address when prompted by the system manager in response to the selection of menu entry 'Configure New Room' of FIG. 8. The system manager will then assign an unused address to the IRB for short address identification and send the name and short address to the IRB using the long address to address it. Multiple settops in the same room are handled by entering the same room name for all IRBs.

Several other configuration options are suggested by the system manager screen of FIG. 8. Changing of the permanent (long) address permits an operator to change the long address for a room, but keep the same name and short address assignment. The system manager will send the same name and short address to the IRB using the new long address to address it. This command is used for replacement of broken boxes when all of the old configuration needs to remain intact, and only the long address must change.

Changing of the room name permits an operator to change the room name, but keep the same long address and short address assignment. The system manager will send the new name to the IRB using the short address to address it.

The View Room Name option permits the operator to select any Room Name and view the long address. The Toggle Switched Outlet option permits the operator to toggle the IRB switched outlet. The two states are on and off. When the on state is chosen, it causes the IRB power outlet to continue to supply power to the television even when the "TV OFF" button is pushed at the IRB. When the OFF state is chosen, the power outlet follows the on/off state of the IRB.

As noted above, the present invention is not limited to the configuration of new IRBs in a hotel system. For example, it may be desirable to periodically poll remote terminals in a cable system to determine which channel the various remote terminals have tuned at a particular time. Other data generated at the remote terminals may also be recovered by the present technique, e.g. billing information. The recovery of billing information is particularly useful in impulse pay-per-view systems. Such billing information may be transmitted, for example, over a telephone network.

While the foregoing description is directed to a presently preferred embodiment, it will be apparent to those of ordinary skill that various modifications may be made without departing from the true spirit or scope of the invention which is to be limited only by the appended claims.

APPENDIX

The following Appendix lists an algorithm which may be utilized to implement the present invention.

```
#define MASK_RATIO          0.693

Units Expected = Some Number

/* put all boxes in configuration mode */
SetConfigMode(GLOBAL_ADDRESS);

/* 1023 is the current system maximum */
Mask = 1023;

while (! Done)

SeedRandomAddress (GLOBAL_ADDRESS);  /* Regenerate the random address */

/* Find the optimum mask value */
        while ( (Mask * MASK_RATIO)  >   UnitsExpected)
                Mask = Mask > > 1;      /* Divide mask by 2 */

/* lowest mask value is 0x0F  (15) */
        /* This limit is based on the maximum number of new units we expect to */
        /* have coming on line during one pass through the loop. */
        if(Mask  <  0x0F)
                Mask = 0x0F;

/* Send the current mask value to all units */
        SetRandomAddressMask (GLOBAL_ADDRESS, Mask);

/* loop for Mask+1 times */
        for(i = 0; i  <   Mask+1; i++)
        {
                /* use autoconfig address to request boxes to report long address */
                /*     if its mask matches the autoconfig mask */
                Address = ReportLongAddress(CONFIG_ADDRESS)
                if (Address != ERROR)

/* Save the Address found */
                        SaveAddress(Address);

/* and send a message directly to that box so it will not respond */
                        /* to any further messages sent to the CONFIG_ADDRESS */
                        TalkToBox(Address);

/* Decrement number of units expected */
                        /* (unless we are in a steady state system, new units expected */
                        /* at about the same rate that existing ones are found) */
                        —UnitsExpected;
        }
        /* Just some way of telling that we should quit */
        Done = AreWeDone();
        if (Done)
                break; /* from for loop */
```

I claim:

1. A method of controlling the transfer of data from a plurality of remote terminals to a central location over a communication network, said method comprising the steps of:
   generating random numbers respectively associated with each of said plurality of remote terminals;
   determining a mask value at the central location;
   prompting said remote terminals by said central location; and
   comparing the random numbers associated with each remote terminal with said mask value to determine whether a respective terminal should transfer data to said central location based on the result of the comparison when said remote terminals are prompted by said central location.

2. The method according to claim 1 further comprising the step of:
   incrementing the random number associated with each remote terminal by a predetermined value if data is not transferred to said central location when said remote terminals are prompted by said central location.

3. The method according to claim 2 further comprising the steps of:
   monitoring the number of times the remote terminals are prompted to transfer data to said central location;
   generating new random numbers associated with each remote terminal when the monitored number of times has a predetermined relationship with said mask value.

4. The method according to claim 3 wherein new random numbers associated with each remote terminal are generated when the monitored number of times equals the mask value.

5. The method according to claim 2 wherein the random number is increased by a predetermined value.

6. The method according to claim 5 wherein the predetermined value is one.

7. The method according to claim 2 wherein the random number is decreased by a predetermined value.

8. The method according to claim 7 wherein the predetermined value is one.

9. The method according to claim 1 wherein the random numbers associated with each remote terminal are generated by a counter associated with each terminal.

10. The method according to claim 1 wherein the mask value is determined in accordance with the number of remote terminals.

11. The method according to claim 1 wherein the comparing step comprises logically comparing the random numbers with the mask value.

12. The method according to claim 11 wherein the random numbers are ANDed with the mask value.

13. The method according to claim 1 wherein said communication network comprises a telephone network.

14. A method of automatically identifying a plurality of remote terminals each having a unique identifier from a central location, said method comprising the steps of:
   generating random numbers respectively associated with each of said plurality of remote terminals;
   determining a mask value at the central location;
   transmitting commands to said remote terminals by said central location; and
   comparing the random numbers associated with each remote terminal with said mask value to determine whether a respective terminal should transfer the identifier to said central location in response to the commands transmitted by said central location.

15. The method according to claim 14 wherein the central location has a list of stored identifiers, the method further comprising the step of:
   comparing an identifier transferred to said central location with the list of stored identifiers to determine whether the transferred identifier is contained in the list of stored identifiers.

16. The method according to claim 15 wherein if the transferred identifier is contained in the list of stored identifiers, the method further comprising the steps of:
   conditioning the remote terminal associated with the transferred identifier to not attempt to transfer the associated unique identifier to said central location in response to commands transmitted by said central location.

17. The method according to claim 15 wherein if the transferred identifier is not contained in the list of stored identifiers, the method further comprising the steps of:
   adding the transferred identifier to the list of stored identifiers;
   conditioning the remote terminal associated with the transferred identifier to not attempt to transfer the associated unique identifier to said central location in response to commands transmitted by said central location.

18. An apparatus for controlling the transfer of data to a central location over a communication network, the central location determining a mask value and transmitting commands, said apparatus comprising:
   random number generating means for generating a random number;
   comparison means for comparing the random number with the mask value determined by said central location to determine whether the apparatus should transfer data to said central location in response to the commands transmitted by said central location based on the result of the comparison.

19. The apparatus according to claim 18 wherein said apparatus is adapted to transfer data over a telephone network.

20. The apparatus according to claim 18 wherein said random number generating means comprises a counter.

21. The apparatus according to claim 18 wherein said comparison means comprises an arrangement of logic gates.

22. The apparatus according to claim 21 wherein said logic gates comprise AND gates.

23. Control apparatus for controlling the transfer of stored data to a central location from a plurality of remote terminals over a communication network, each terminal having a random number generator, said control apparatus comprising:
   prompt means at the central location for prompting each of the remote terminals to generate a respective random number;
   mask means at the central location for determining a mask value;
   compare means for comparing the random numbers respectively generated in the remote terminals with the mask value to determine whether a respective terminal should transfer data to said central location based on the result of the comparison.

24. A method of controlling the transfer of data from a plurality of remote terminals to a central location over a communication network, said method comprising the steps of:
- generating random numbers respectively associated with each of said plurality of remote terminals;
- determining a mask value;
- prompting said remote terminals by said central location;
- comparing the random numbers associated with each remote terminal with said mask value to determine whether a respective terminal should transfer data to said central location based on the result of the comparison when said remote terminals are prompted by said central location;
- incrementing the random number associated with each remote terminal by a predetermined value if data is not transferred to said central location when said remote terminals are prompted by said central location;
- monitoring the number of times the remote terminals are prompted to transfer data to said central location; and
- generating new random numbers associated with each remote terminal when the monitored number of times has a predetermined relationship with said mask value.

25. The method according to claim 24 wherein new random numbers associated with each remote terminal are generated when the monitored number of times equals the mask value.

26. A method of automatically identifying a plurality of remote terminals each having a unique identifier from a central location, the central location having a list of stored identifiers, said method comprising the steps of:
- generating random numbers respectively associated with each of said plurality of remote terminals;
- determining a mask value;
- transmitting commands to said remote terminals by said central location;
- comparing the random numbers associated with each remote terminal with said mask value to determine whether a respective terminal should transfer the identifier to said central location in response to the commands transmitted by said central location; and
- comparing an identifier transferred to said central location with the list of stored identifiers to determine whether the transferred identifier is contained in the list of stored identifiers.

27. The method according to claim 26 wherein if the transferred identifier is contained in the list of stored identifiers, the method further comprising the steps of:
- conditioning the remote terminal associated with the transferred identifier to not attempt to transfer the associated unique identifier to said central location in response to commands transmitted by said central location.

28. The method according to claim 27 wherein if the transferred identifier is not contained in the list of stored identifiers, the method further comprising the steps of:
- adding the transferred identifier to the list of stored identifiers;
- conditioning the remote terminal associated with the transferred identifier to not attempt to transfer the associated unique identifier to said central location in response to commands transmitted by said central location.

29. A method of controlling a plurality of remote terminals which transmit data to a central location over a communication network in response to commands from said central location, said method comprising the steps of:
- generating random numbers in said remote terminals in response to a first command;
- setting a predetermined number in said remote terminals to fix a frequency at which said remote terminals respond to a second command;
- comparing the random numbers in said remote terminals with the predetermined number; and
- transmitting data from said remote terminals over said communication network in accordance with the comparisons of the random numbers with the predetermined number.

30. The method according to claim 29 wherein said communication network comprises an RF data channel.

31. The method according to claim 29 wherein said method further comprises the step of:
- transmitting an acknowledgment from said central location to remote terminals transmitting data which is received by said central location.

32. The method according to claim 31 further comprising the step of:
- incrementing the random numbers in unacknowledged remote terminals to generate new random numbers in said unacknowledged remote terminals;
- comparing the new random numbers in said unacknowledged remote terminals with the predetermined number; and
- transmitting the data from said unacknowledged remote terminals over said communication network in accordance with the comparisons of the new random numbers with the predetermined number.

33. The method according to claim 32 wherein the steps of claim 32 are repeated until said central location transmits an acknowledgment to each of said remote terminals.

34. The method according to claim 29 wherein the step of generating random numbers comprises reading a counter respectively associated with each of said remote terminals.

35. The method according to claim 29 wherein the step of setting the predetermined number comprises transmitting the predetermined number from said central location to said remote terminals.

* * * * *